United States Patent
Kattil et al.

(10) Patent No.: US 11,620,596 B2
(45) Date of Patent: Apr. 4, 2023

(54) METHOD AND SYSTEM FOR AUTOMATIC ACTIVITY BROADCASTING

(71) Applicant: ORACLE INTERNATIONAL CORPORATION, Redwood Shores, CA (US)

(72) Inventors: Prashobh Kattil, Malappuram (IN); Michael Daniel Wierzbowski, Gainesville, FL (US); Oleksiy Turchyn, Cleveland, OH (US); Tene Thomas, Trivandrum (IN)

(73) Assignee: Oracle International Corporation, Redwood Shores, CA (US)

( * ) Notice: Subject to any disclaimer, the term of this patent is extended or adjusted under 35 U.S.C. 154(b) by 479 days.

(21) Appl. No.: 16/271,936

(22) Filed: Feb. 11, 2019

(65) Prior Publication Data

US 2019/0251497 A1 Aug. 15, 2019

Related U.S. Application Data

(60) Provisional application No. 62/629,369, filed on Feb. 12, 2018.

(51) Int. Cl.
*G06Q 10/06* (2012.01)
*G06Q 10/10* (2012.01)
(Continued)

(52) U.S. Cl.
CPC ........... *G06Q 10/063114* (2013.01); *G06Q 10/063112* (2013.01); *G06Q 10/1097* (2013.01)

(58) Field of Classification Search
CPC ... G06Q 10/063112; G06Q 10/063114; G06Q 10/1097
See application file for complete search history.

(56) References Cited

U.S. PATENT DOCUMENTS 8,612,276 B1 * 12/2013 Nielsen .......... G06Q 10/063118
705/7.22
10,810,525 B1 * 10/2020 Cruickshank, III ........................
G06Q 10/063116
(Continued)

OTHER PUBLICATIONS

ZOHO Corp., ("How to share request in ServiceDesk Plus MSP Software," ManageEngine ServiceDesk Plus MSP, ZOHO Corp. 2017, https://www.manageengine.com/products/service-desk-msp/help/adminguide/requests/share-request.html).*
(Continued)

*Primary Examiner* — Renae Feacher
(74) *Attorney, Agent, or Firm* — Kraguljac Law Group, LLC (57) ABSTRACT

Systems, methods, and other embodiments associated with deploying resources are described. In one embodiment, a method includes receiving a service request comprising an activity to be performed, and accessing a database to identify resources eligible to perform the activity, and a remote device associated with the plurality of resources. An electronic invitation to perform the activity is generated, and includes an option that is selectable by each of the plurality of resources to indicate acceptance of the electronic invitation to perform the activity. The electronic invitation is concurrently transmitted to the remote device associated with each of the plurality of resources identified from the data structure. An earliest acceptance of the electronic invitation is received from a first resource over the communication network, and a schedule associated with the first resource is modified to include the service request as a result of receiving the earliest acceptance.

20 Claims, 7 Drawing Sheets

(51) Int. Cl.
*G06Q 10/0631* (2023.01)
*G06Q 10/1093* (2023.01)

(56) References Cited

U.S. PATENT DOCUMENTS

| | | | | |
|---|---|---|---|---|
| 2004/0267595 | A1* | 12/2004 | Woodings | G06F 16/258 |
| | | | | 705/7.14 |
| 2005/0114195 | A1* | 5/2005 | Bernasconi | G06Q 10/06311 |
| | | | | 705/7.14 |
| 2007/0136100 | A1* | 6/2007 | Daugherty | G06Q 10/10 |
| | | | | 705/3 |
| 2008/0255919 | A1* | 10/2008 | Gorder | G06Q 10/109 |
| | | | | 705/7.13 |
| 2010/0014653 | A1* | 1/2010 | Kumar | H04M 3/5191 |
| | | | | 379/210.01 |
| 2011/0320230 | A1* | 12/2011 | Podgurny | G06Q 10/06311 |
| | | | | 705/7.13 |
| 2012/0029962 | A1* | 2/2012 | Podgurny | G06Q 10/063114 |
| | | | | 705/7.13 |
| 2013/0102292 | A1* | 4/2013 | Kim | H04W 4/16 |
| | | | | 455/414.1 |
| 2013/0138461 | A1* | 5/2013 | Shahraray | G06Q 10/06311 |
| | | | | 705/7.12 |
| 2015/0248649 | A1* | 9/2015 | Avats | G06Q 10/1053 |
| | | | | 705/321 |
| 2015/0317582 | A1* | 11/2015 | Nath | G06Q 10/06311 |
| | | | | 705/7.13 |
| 2016/0132595 | A1* | 5/2016 | Bliss | G06F 16/951 |
| | | | | 707/706 |
| 2016/0132816 | A1* | 5/2016 | Lush | G06Q 10/063112 |
| | | | | 705/7.14 |
| 2017/0039524 | A1* | 2/2017 | Avats | G06Q 50/01 |
| 2017/0301039 | A1* | 10/2017 | Dyer | G06Q 10/063114 |
| 2018/0129371 | A1* | 5/2018 | Fowler | G06Q 10/1097 |
| 2020/0118056 | A1* | 4/2020 | Leslie | G06Q 10/063112 |

OTHER PUBLICATIONS

Needle, David, "Salesforce Field Service Lightning Gives Field Workers a Mobile Edge," eWeek, Mar. 15, 2016, p. 1.*

* cited by examiner

ADD ACTIVITY (PLANNING) — 400

*ACTIVITY TYPE: DVR UPGRADE ▶ — 405

*NAME: HD ▶ — 410

WORK ORDER: ▶

DATE: 09/04/22 ▶ — 415

START TIME: 11 ▶ : 30 ▶ ⎫
END TIME: 12 ▶ : 30 ▶ ⎭ — 420

CUSTOMER INFORMATION

STREET: _430_

CITY:

STATE:

ZIP CODE:

— 425

EMAIL: _440_  WRITE
PHONE 1: _445_  CALL
MOBILE: _450_  CALL — 455
LANGUAGE: ENGLISH ▶

— 435

SEND

METHOD AND SYSTEM FOR AUTOMATIC ACTIVITY BROADCASTING

CROSS-REFERENCE TO RELATED APPLICATIONS

This application claims the benefit of U.S. Provisional Application No. 62/629,369, filed Feb. 12, 2018, which is incorporated in its entirety herein by reference.

BACKGROUND

Field service providers manage a fleet of vehicles and diverse service personnel to render services to customers at various different locations within a service region. The vehicles may be equipped with different tools and other equipment required to render specific services to different customers. Further, service personnel such as service technicians may have different skill sets or acquired experience in a given field. Service technicians that are highly skilled, or have significant amounts of experience are often dispatched to resolve particularly problematic service requests. Lesser-skilled or novice technicians are more common, and can be utilized frequently to resolve routine service requests in a cost-effective manner when an advanced skillset is not required.

Service requests are typically added to a technician's schedule in advance of the date on which an appointment is scheduled. Thus, it is common for a technician's schedule to appear full for a given day or other service period. Despite the appearance of the schedule as full, the technician may, in fact, have the availability to answer an additional service request on that day. For example, the technician may be aware of a ready solution to a common problem giving rise to one or more scheduled service requests, allowing the technician to quickly resolve such problems. As another example, the technician may be available to answer a service request before or after typical business hours.

In most instances, knowledge of the technician's availability despite the appearance of a full schedule resides with the technician alone, and is not apparent to a dispatcher. A dispatcher seeking to add a service request, such as an urgent request for example, to a technician's full schedule would be required to call or message the individual technician and ask about the technician's availability. If the technician was truly unavailable, the dispatcher could call or message a second technician in an attempt to add the new service request to the second technician's schedule. This process would continue until the new service request could be added to a technician's schedule, or the new service request was simply scheduled for the next known availability of one of the technicians.

More recently, attempts have been made to automate the process of adding a service request to a technician's service schedule that appears to be full. Such automated systems traditionally assigned a new service request to a technician's schedule based on relative availability, proximity to the service location, or other heuristic technique. If the technician rejected the assignment, the system assigned the service request to the schedule of another technician based on the assignment criteria. This sequential assignment process would continue until the assignment was not rejected.

Because the traditional assignment systems operated sequentially, re-assigning a service request only after it has been rejected by a technician, lengthy delays in adding a new service to a technician's schedule were introduced. After several iterations of the sequential process, each involving a delay until a time when the respective technician could respond, the service request being added could be delayed by days.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

FIGS. 6A-6D illustrate embodiments of a graphical user interface generated by a remote device associated with a field resource based on content transmitted by a dispatch terminal where

DETAILED DESCRIPTION

The present disclosure involves a resource deployment system and method. One problem with existing solutions is how to efficiently find a field resource to assign an activity to when the schedule for the resource appears to be full, lacking any apparent availability. A dispatcher can try to contact each resource individually to see if they can pick-up the work or other activity, and/or contact a supervisor of the resources who will, in turn, contact the resources individually for the same purpose. Such approaches are very inefficient and the work may not be assigned to the best resource available. Assignments may best be performed by resources who are never contacted because the work is assigned before it is ever offered to the resource in the best position to perform the activity.

Attempts to automate the process of adding a service request to a resource's service schedule that appears full have traditionally followed the sequential approach that was previously performed manually. New service requests are assigned to a resource's schedule based on perceived availability, proximity to the service location, or other technique. If the resource rejects the assignment, the system has traditionally assigned the service request to the schedule of another resource based on the assignment criteria. This sequential assignment process would continue until the assignment was not rejected.

Because the traditional assignment systems operated sequentially, re-assigning a service request only after it has been rejected by a resource, lengthy delays in adding a new service to a resource's schedule were introduced. After several iterations of the sequential process, each involving a delay until the respective resource could respond and decline a new service request, the service request being added could be delayed by hours, days, or longer. As a result of such delays, a resource that otherwise had the capacity to respond to the service request when it was received, may not be presented with the opportunity to do so during that day or other period. As a result, the resource's schedule may become full in the meantime. When the new service request being added eventually does reach the resource, the resource may no longer have the capacity to accept it because of the delay introduced by the sequential approach to adding the service request to a schedule.

A computerized system and method are described herein that implement a system for concurrently broadcasting an activity to field resources in an electronic invitation. In one embodiment, the electronic invitation is generated according to parameters in a profile created for a type of service request. The profile can optionally be retrieved from a data structure stored in a database based on the activity to be performed in fulfillment of the service request.

The electronic communication includes an electronic invitation of each resource associated with a remote device that receives the electronic invitation to perform the activity to fulfill the service request. The electronic invitation is broadcast, over a communication network to a plurality of remote devices, each associated with a different resource. The electronic invitation can be broadcast as a single communication, concurrently transmitted to the different remoted devices. Each of the different remote devices to which the electronic invitation is transmitted is specified in the profile retrieved from the data structure.

A schedule associated with the first resource that inputs an acceptance into the respective remote device is modified to include the service request. The modified schedule can also include information about the customer such as the location where the activity is to be performed, and/or information identifying the activity to be performed according to the service request. Once the schedule for the first-accepting resource is modified, the electronic invitation broadcast concurrently to the resources is no longer capable of being accepted to cause the service request to be added to a second schedule, associated with a later-accepting resource. Thus, aside from optionally generating the service request, the apparently-full schedule of at least one resource can be modified, without manual intervention from a dispatcher, to include the service request.

Figure 1:
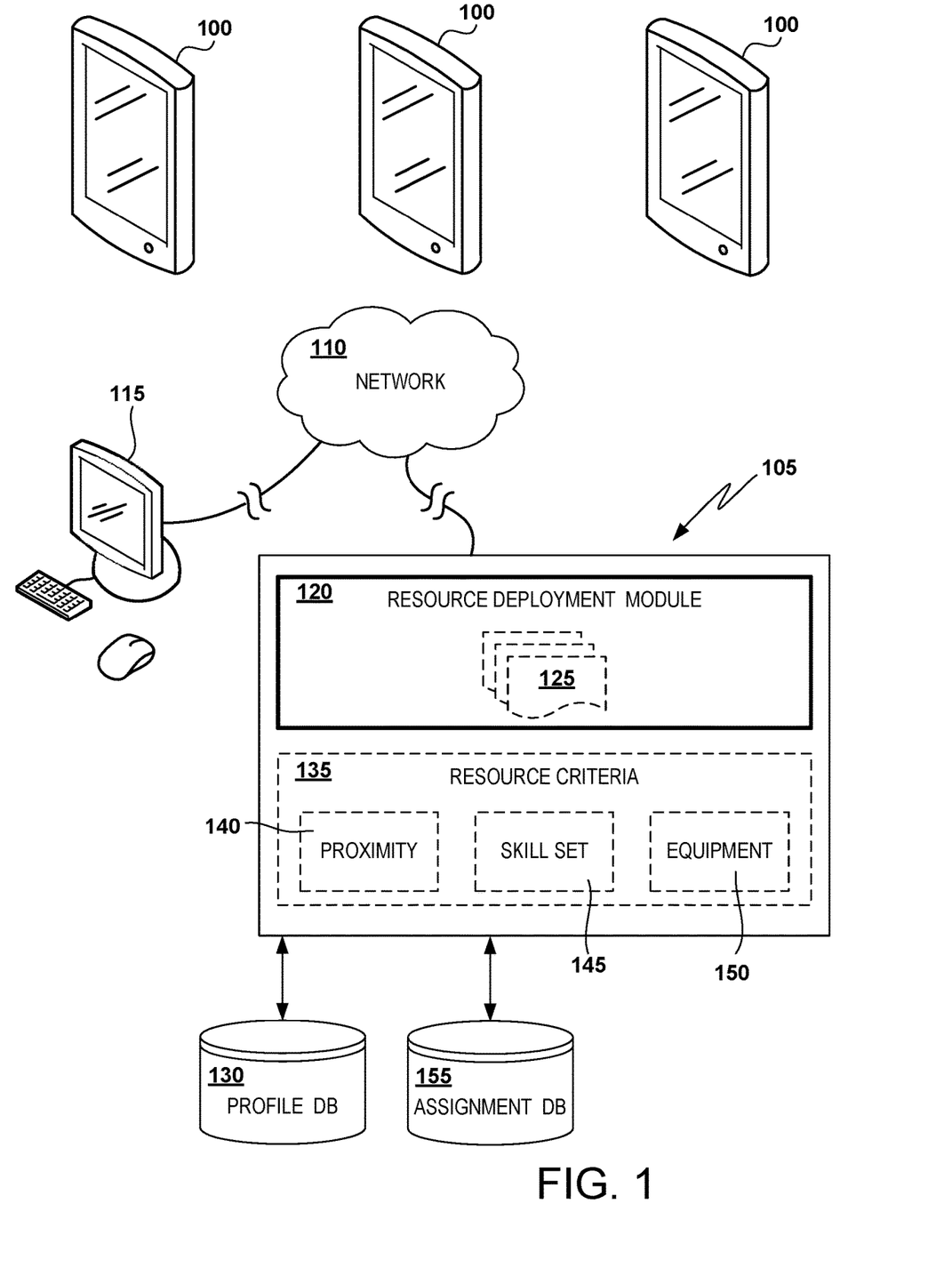
FIG. 1 illustrates an environment including a multi-tenant dispatch terminal operatively connected to a plurality of remote devices associated with different field resources over a communication network.

Turning to the drawings, FIG. 1 shows an illustrative environment for concurrently transmitting an electronic invitation to a plurality of remote devices 100, each associated with a different resource. Examples of the remote devices include portable electronic devices that communicate wirelessly over a communication network 110. For example, the remote devices 100 can include a tablet computer, smartphone, laptop computer, and the like.

The environment also includes a multi-tenant platform 105 that can host content, user interfaces, websites, applications or other information to be concurrently accessed by remote tenants over a communication network 110. For example, a dispatch terminal 115 operated at a service facility, call center, etc. to manage incoming service requests from customers can request a user interface from the multi-tenant platform 105 over the communication network 110. The retrieved user interface can include fields to be populated with data for creating a profile that governs how a service request is to be routed as described with reference to FIG. 3.

Further, the dispatch terminal 115 can also retrieve, from the multi-tenant platform 105, a user interface for generating an electronic invitation 125 to perform an activity in fulfillment of a service request as described with reference to FIG. 4.

Figure 2:
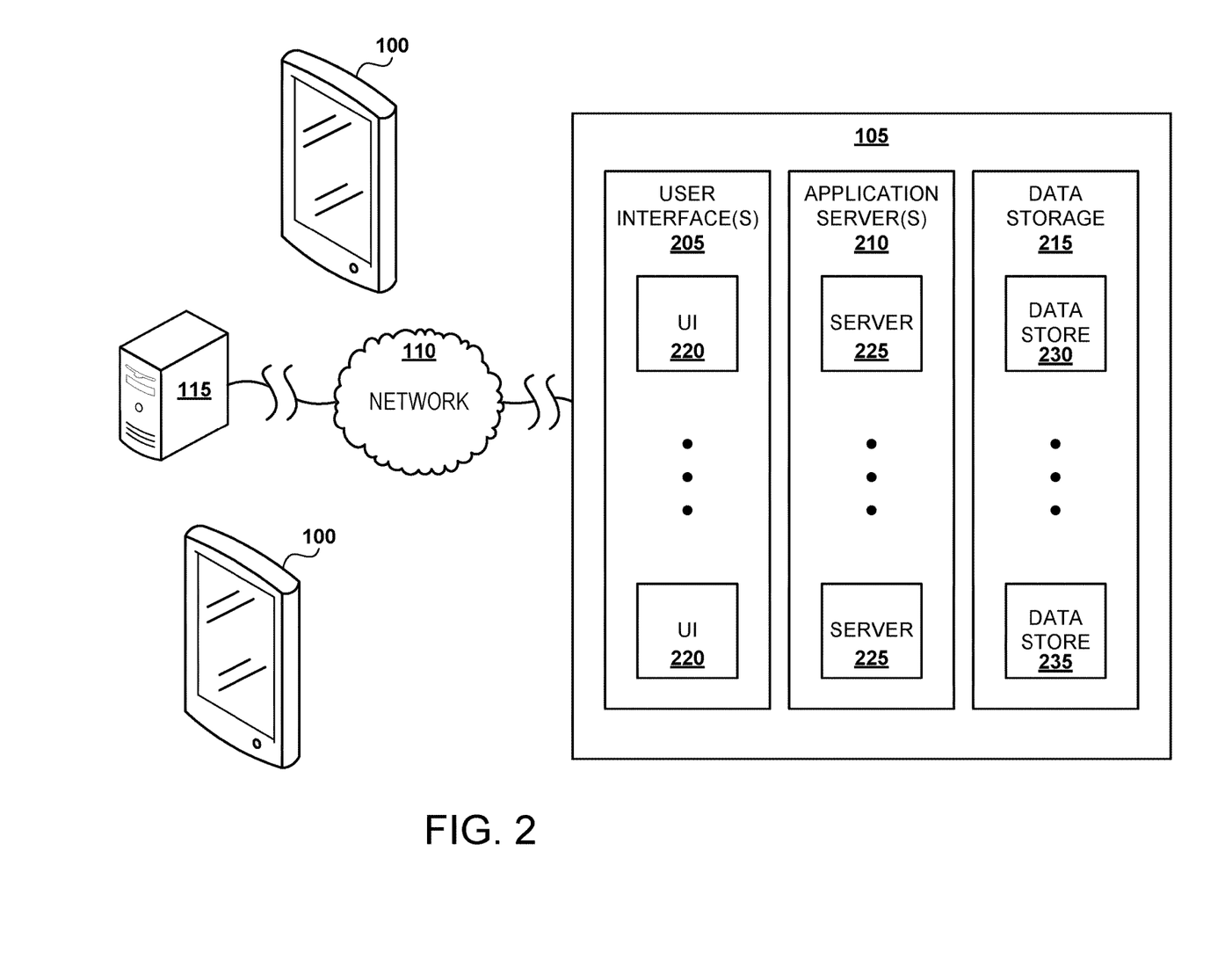
FIG. 2 illustrates an environment including a multi-tenant platform operatively connected to communicate with a dispatch terminal via a communication network.

The multi-tenant platform 105 can include multiple processing tiers or layers, including a user interface layer 205, an application layer 210, and a data storage layer 215. The user interface layer 205 may maintain multiple user interfaces 220, including graphical user interfaces and/or web-based interfaces. The user interfaces 220 may include a default user interface for the platform (e.g., an administrative UI), as well as one or more user interfaces extended by one or more tenants of the system (e.g., via access to one or more APIs).

Each tier or layer may be implemented with a set of computers and/or computer components including computer servers and processors, and may perform various functions, methods, processes, or operations as determined by the execution of a software application or set of instructions hosted by the multi-tenant platform 105. For example, the application layer 210 can include one or more application servers 225 that each store an application module for serving content over the communication network 110 to the dispatch terminal 115, and/or the remote devices 100.

The data storage layer 124 may include one or more active data stores 230 (e.g. profile database 130 described below) and one or more testing, validation and/or backup data stores 235. Data stores may be implemented with any suitable data storage technology including structured query language ("SQL") based relational database management systems ("RDBMS"). Being multi-tenant, the multi-tenant platform 105 hosts content and services that can concurrently be accessed by at least the dispatch terminal 115 and a plurality of remote devices 100. According to one embodiment, the remote devices 100, the dispatch terminal 115 and/or the multi-tenant platform 105 can be implemented as a computing device 700, as shown and described with reference to FIG. 7, for example.

With continued reference to FIG. 1, the multi-tenant platform 105 includes a resource deployment module 120 that generates and controls concurrent transmission of an electronic invitation 125 to the remote devices 100. In response to a communication involving the dispatch terminal 115, the resource deployment module 125 accesses a data store such as a profile database 130 storing data structures defining invitation profiles. The data structure can be selected based on the type of activity to be performed in fulfillment of the service request.

The resources can include any personnel who are to perform an activity in fulfillment of a service request submitted by a customer. An example of a resource includes a service technician who installs, repairs, modifies, and otherwise services cable or satellite television installations, telephone installations, or other hardware and/or software at residential and/or business locations. Other examples of resources include, but are not limited to, drivers, couriers, programmers, doctors, etc.

Concurrent transmission includes simultaneous transmission of a single communication such as an electronic invitation 125 to a plurality of different remote devices associated with different resources. However, concurrent transmission also encompasses batch transmissions of multiple communications in rapid succession to a plurality of different remote devices associated with different resources.

Concurrently-transmitted communications received by different remote devices allows the resources to consider the electronic invitation 125 to perform an activity during substantially the same time period. By concurrently transmitting the electronic invitation 125 to the different eligible resources, the resources themselves can determine their availability, at the same time, and decide whether to accept a new service request in their schedule. The resources can make such a decision without manual intervention by a dispatcher.

Resource criteria 135 are identified from the data structure within the profile database 130 accessed by the resource deployment module 120. The resource criteria 135 can be used as a filter by the resource deployment module 120 to limit the pool of resources to which the electronic invitation 125 is to be concurrently transmitted. For example, the electronic invitation 125 is to be concurrently transmitted to the resources who most-closely match the resource criteria.

For the example illustrated in FIG. 1, the resource criteria 130 include the proximity 140 of the resource to the location where the activity is to be performed. According to one embodiment, the resources to whom the electronic invitation 125 is to be concurrently transmitted can be limited to those who are already scheduled to work within a region (e.g., a zip code) where the activity is to be performed. For another embodiment, the resources to whom the electronic invitation 125 is to be concurrently transmitted can be limited to those who are already scheduled to work within a defined distance (e.g., within 10 miles) of an address where the activity is to be performed. The resources can be filtered to identify those resources whose schedules satisfy the proximity 140 criterion within a time period defined in the profile (e.g., within the next week).

Another example of the resource criteria 135 is information indicative of a qualification or other skill set 145 possessed by the resources included in the data structure accessed within the profile database 130. Some activities performed as part of a service request can be performed by a resource having a relatively-low level of training or expertise, while other activities may require a relatively-high level of training or expertise.

Yet another example of the resource criteria 135 is equipment 150 required to perform the activity in fulfillment of the service request. Certain equipment such as advanced analytical devices, meters, etc. can be expensive, or require extensive training to use. Such equipment may be distributed to only a limited number, but fewer than all, of the resources who are most apt to use the equipment, or comprise the required expertise to make use of the equipment. A description of the activity to be performed, or optionally an itemized description of the required equipment to perform the activity can be determined from the data structure accessed within the profile database 130. From this information, the resource deployment module 120 can limit transmission of the electronic invitation 125 to the remote device 100 associated with those resources who are properly equipped to perform the activity. The profile database 130 can include a plurality of data structures, each with a collection of resources that have been designated as being eligible to perform different activities, based on any parameter.

As service requests are assigned to the schedules of different resources as described herein, the assignments are stored in a data store 235 such as an assignment database 155, for example. Data structures corresponding to the schedule of each resource can also optionally be stored in the assignment database 155, or a different data store. The data structures corresponding to the schedules of the resources can optionally be compatible with a calendar or task client such as Microsoft Outlook, for example, to render a graphical representation of the schedules in a calendar format.

Figure 3:
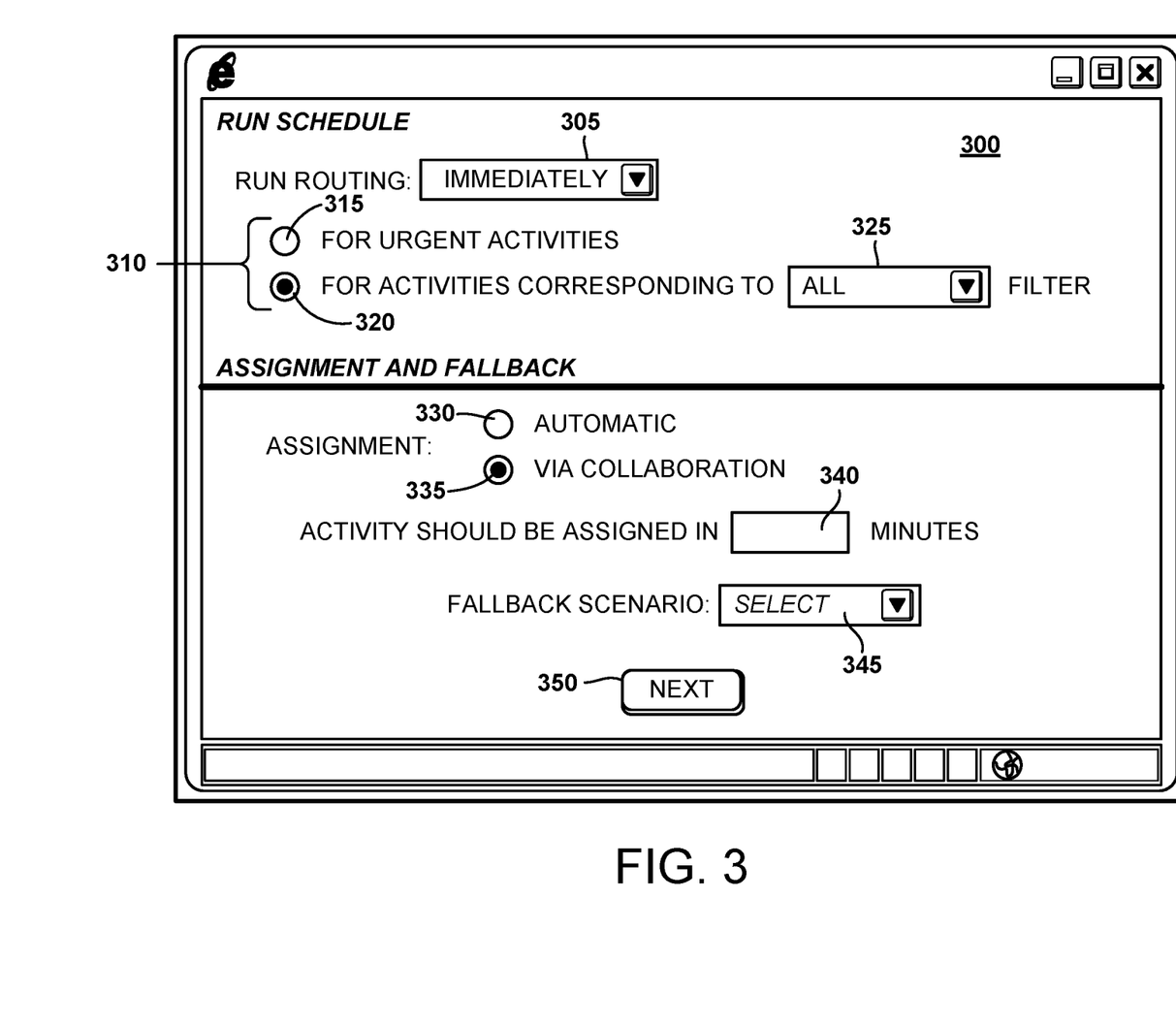
FIG. 3 illustrates an embodiment of a graphical user interface served by a user interface layer of a multi-tenant platform in response to a request submitted by a dispatch terminal over a communication network.

FIG. 3 illustrates an embodiment of a profile graphical user interface ("GUI") 300 served by the user interface layer 205 (FIG. 2) in response to a request submitted by the dispatch terminal 115 over the communication network 110. The profile GUI 300 includes fields that receive user input submitted via the dispatch terminal 115 for creating a profile that governs how an electronic invitation 125 is transmitted to the remote devices 100 accompanying different resources. The profile, once created, includes a run schedule, assignment type and fallback for deploying a resource to perform an activity in fulfillment of a service request.

The run schedule defines when, and optionally how frequently, an electronic invitation 125 is to be transmitted for a service request. For example, a drop-down menu 305 within the profile GUI 300 can be manipulated via the dispatch terminal 115 to specify when an electronic invitation 125 is to be transmitted relative to creation of a service request. In FIG. 3, the electronic invitation 125 is to be concurrently transmitted, or broadcast, to the remote device 100 of eligible resources immediately, once an appropriate service request is created.

A menu 310 of selectable radio buttons, for example, can also be provided within the profile GUI 300 to identify the type of service request to which the profile applies. The embodiment shown in FIG. 3 includes an urgent radio button 315 that applies the run schedule to service requests designated as urgent. A service-type radio button 320 is also provided to limit application of the run schedule identified in the profile GUI 300 to specific types of service requests, other than urgent service requests. A drop-down menu 325 is provided to allow for selection of one of a plurality of defined types of service request to which the profile applies. The drop-down menu 325 can be populated with any number of service request or activity types such as installation, removal, repair, etc.

The profile GUI 300 also includes fields that receive user input to define how a service request of a type specified using the menu 310 will be added to the schedule of a resource. Service requests can be automatically assigned to a resource unilaterally, by the multi-tenant platform 105, if the radio button 330 corresponding to automatic assignment in FIG. 3 is set. According to such an option, the multi-tenant platform 105 modifies a data structure corresponding to the schedule of a resource, thereby adding a service request to the schedule.

The resource to whom the service request is assigned can be selected as the resource that the multi-tenant platform 105 determines has the most capacity to accept the service request. The determination can be made based on openings in the resource's schedule, proximity of the resource to the location where the activity of the service request is to be performed, or any other consideration.

According to automatic assignment of a service request, the service request is deemed to be accepted by the resource unless the resource rejects the assigned service request after it has been assigned. In other words, assignment of the service request involves modifying the data structure corresponding to a schedule for a resource to include the service request in the schedule. The resource to whom the service request has been assigned can be notified. The resource can opt to reject the already-assigned service request, thereby causing subsequent modification of the data structure to remove the service request from the corresponding schedule.

In contrast, the radio button 335 for assigning a service request "via collaboration" can be selected to cause an electronic invitation 125 to be concurrently transmitted to the remote device 100 for each of a plurality of eligible resources before the corresponding service request is assigned. The plurality of eligible resources that are to receive the electronic invitation 125 via their remote devices 100 are identified based on the resource criteria 135. The resource criteria are defined by the data structure that is accessed in the profile database 130.

Selection of the radio button 335 corresponding to "via collaboration" causes the electronic invitation 125 to be concurrently transmitted to the remote devices 100 without first assigning the service request to one or more of the resources. Instead, the electronic invitation 125 to perform an activity in fulfillment of the service request is to be concurrently transmitted to the remote devices. The schedule of a first resource that elects to accept the electronic invitation 125 earliest in time is modified to include the service request. Once the earliest acceptance is received by the multi-tenant platform 105, the concurrently-transmitted electronic invitation 125 can no longer be accepted by a second resource to cause the multi-tenant platform 105 to add the service request to the second resource's schedule.

Selecting the radio button 335 or other suitable input field to designate "via collaboration" avoids sequentially assigning a service request, having it subsequently rejected, re-assigning the service request, and so on until the assigned service request is not rejected. Concurrently transmitting the electronic invitation 125 allows the resources themselves, who are often in the best position to determine availability, and accept the electronic invitation 125 based on their own circumstances. Further, repeatedly modifying calendars to assign, cancel, re-assign, cancel, etc. a service request consumes system resources, which are conserved by modifying one schedule, a single time in response to the earliest acceptance of the electronic invitation 125.

It is possible that an electronic invitation 125, once concurrently transmitted, is not accepted within a tolerable time period. To avoid allowing the electronic invitation 125 to go unaccepted indefinitely, the profile GUI 300 also includes a fallback field 340. A user can input a maximum permissible length of time in the fallback field 340 via the dispatch terminal 115. The value submitted via the fallback field 340 defines a time from the concurrent transmission of the electronic invitation 125 when invitation times out, and is considered to be stale.

A fallback scenario can be selected from a pull-down menu 345 or other suitable data entry field. The selected fallback scenario defines a process that is to be initiated by the resource deployment module 120 in response to expiration of the time established based on the value received within the fallback field 340. For example, a message scenario can be configured as a routing fallback alert through selection of the appropriate option from the pull-down menu 345. When triggered as a result of an electronic invitation 125 becoming stale, the fallback alert can be transmitted by the resource deployment module 120 to a recipient such as a dispatcher using the dispatch terminal 115, for example. The fallback alert notifies the recipient that the activity has not been assigned and needs attention.

Figure 4:
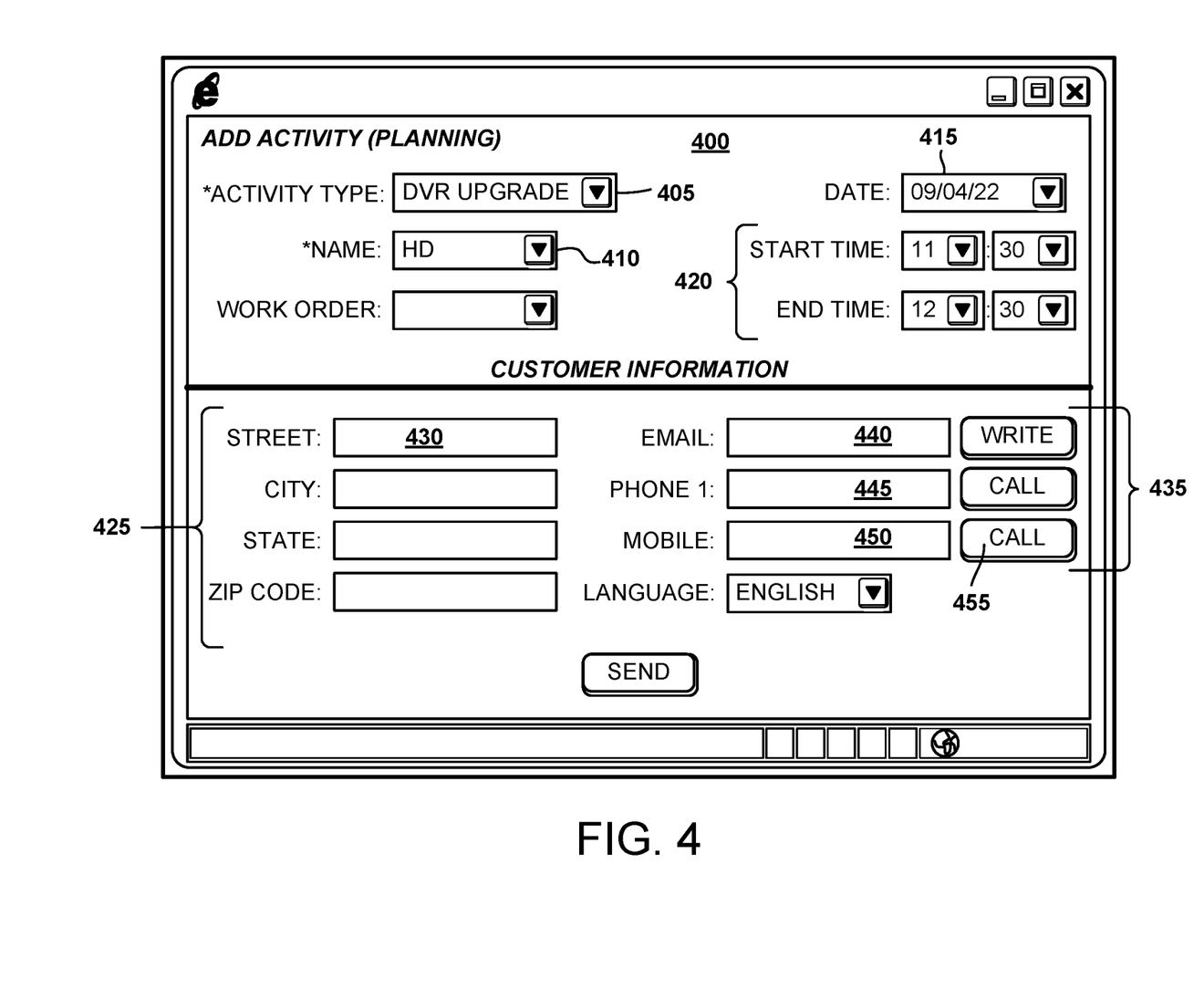
FIG. 4 illustrates an embodiment of a graphical user interface served by a user interface layer of a multi-tenant platform in response to a request submitted by a dispatch terminal over a communication network to add a service request to a schedule associated with one of a plurality of field resources.

Selection of a "NEXT" button 350 within the profile GUI 300 causes the process to progress from the profile GUI 300 to an activity GUI 400, an example of which is shown in FIG. 4. The activity GUI 400 includes fields that receive input to define the activity to be performed by a resource that accepts the corresponding electronic invitation 125. The electronic invitation 125 is generated to include the activity to be performed to fulfill the service request, and at least a portion of the other information submitted via the activity GUI 400. The electronic invitation 125 is transmitted to assign the service request to a resource based on the information submitted via the profile GUI 300.

The activity GUI 400 includes fields that require at least an activity type 405 and an activity name 410 to be specified. The activity type 405 is indicative of the activity to be performed by a resource to fulfill the service request. The activity name 410 defines a name associated with the service request to be stored in a non-transitory, computer-readable medium in the profile database 130, for example.

The activity GUI 400 also includes fields such as a date field 415 and a time field 420 that receive the date and time at which the activity is to be performed, respectively.

Customer information defining where the activity is to be performed, and the customer's contact information can be submitted via the activity GUI 400. For example, as shown in FIG. 4, the customer's location where the activity is to be performed is entered address fields 425. The address fields 425 can allow for free text entry to enable the submission of customer-specific information. However, other embodiments of the resource deployment module 120 can interface with a customer database to auto-populate at least a portion of the address fields 425.

For example, upon typing the first two or three characters in the street field 430, the resource deployment module 120 can optionally query a customer database in an effort to locate a customer with the same first two or three characters in his/her street address. If a match is found, the address information for the matching customer can be populated in at least one, and optionally a plurality of the address fields 425.

The activity GUI 400 further includes one or contact fields 435 in which contact information for the customer or other person with home a resource is to correspond is submitted, and received by the resource deployment module 120. Contact field options include, but are not limited to an email field 440 in which an email address is entered, a first phone field 445 in which a first telephone number is entered, and a mobile phone field 450. An initiation button 455 is associated with each of the fields 440, 445, 450. Selection of the initiation button 455 causes the resource deployment module 120 to initiate a communication with the customer via the information in the respective contact field 435.

Selection of a "SEND" button 460 once the information has been entered into the appropriate fields of the activity GUI 400, causes the resource deployment module 120 to generate an electronic invitation 125. The electronic invitation 125 of a resource to perform the specified activity in fulfillment of a service request, at the specified customer location, is transmitted over the communication network 110 in accordance with the profile defined via the profile GUI 300 of FIG. 3.

As noted above, the activity to be performed is associated with a name and stored in the profile database 130. Service requests with activities that are commonly performed can be recalled by the resource deployment module 120 to be re-assigned to a different resource, for a different customer, and to be performed at a different time as part of a new service request.

For example, the embodiment shown in FIG. 4 is for a service request requiring the activity "DVR UPGRADE" to be performed by a service technician. The activity requires a service technician to replace a customer's standard-definition cable box with a high-definition cable box to fulfil the service request. After a first service request has been assigned to a resource to perform the DVR UPGRADE, the resource deployment module 120 may receive input indicating that another DVR UPGRADE is to be performed. However, the customer and date/time for the second DVR UPGRADE is different than for the first DVR UPGRADE. The resource deployment module 120 can retrieve, from the profile database 130, a data structure including the parameters entered in the profile GUI 300. The retrieved data structure can also include information indicative of the activity and the activity name, submitted via the activity GUI 400. In response to retrieving the data structure, the resource deployment module 120 populates the activity type field 405 and/or the activity name field 410 with the respective information from the retrieved data structure.

The dispatcher, via the dispatch terminal 115, can submit the information specific to the current service request for the date and time fields 415, 420 and the customer fields 425. The resource deployment module 120 can receive and combine the pre-populated and dispatcher-specified service request information, and generate the electronic invitation 125. Thus, a data structure corresponding to a previously-generated electronic invitation 125 can be utilized as a template, allowing ready preparation of a subsequent electronic invitation 125 to perform a common activity.

Figure 5:
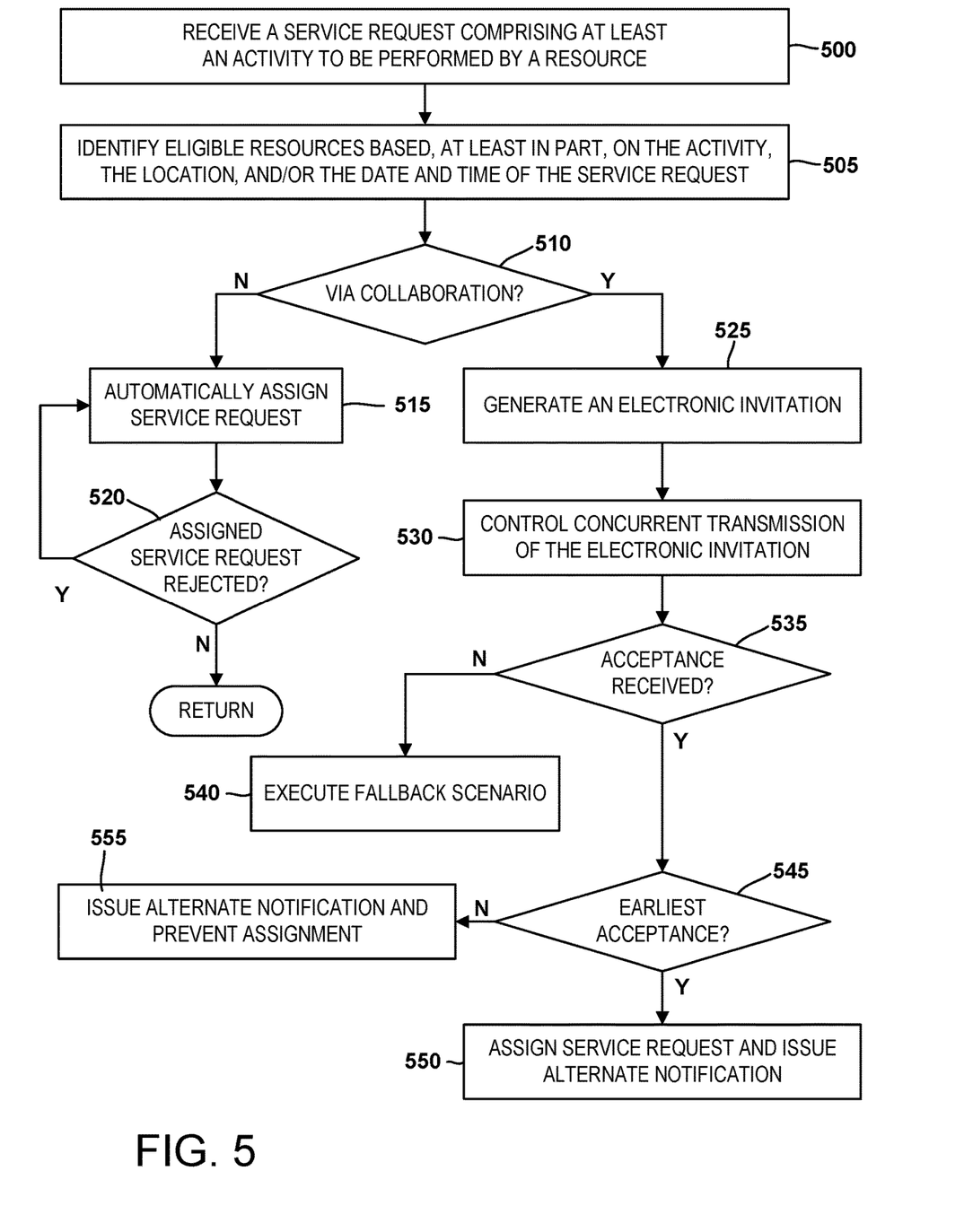
FIG. 5 is a flow diagram schematically depicting a computer-implemented process of assigning a service request to a resource having a schedule that appears to be full.

FIG. 5 is a flow diagram schematically depicting a computer-implemented process of assigning a service request to a resource having a schedule that appears to be full. A service request comprising an activity to be performed is received by the resource deployment module 120 at block 500. The received service request includes at least: the way the service request is to be assigned based on information received via the profile GUI 300, and the activity to be performed in fulfillment of the service request received via the activity GUI 400.

The resource deployment module 120 identifies a plurality of resources eligible to perform the activity in the received service request at block 505. The eligible resources can be identified by filtering a library of resources stored in a data structure, such as in the profile database 130 for example. Using at least a portion of the information in the received service request, the resource deployment module 120 can identify resources that: (i) have the requisite skill to perform the activity, (ii) having equipment required to perform the activity, (iii) are scheduled to be at, or near the location where the activity is to be performed at the date and time specified in the service request, (iv) any other information included in the service request, or (v) any combination thereof. Information associated with a remote device 100 linked to each of the eligible resources is also identified to enable the resource deployment module 120 to communicate with those remote devices 100.

At block 510, it is determined whether the received service request is to be assigned via collaboration, as described herein with reference to FIG. 3. If not, then the resource deployment module 120 causes the service request to be automatically assigned to the one of the eligible resources at block 515. The resource deployment module 120 also controls transmission of an assignment notification 600, as shown in FIG. 6B, to the remote device 100 linked to resource that the service request has been assigned to. The assignment notification 600 serves as a confirmation that the resource receiving the notification is to perform the activity in fulfillment of the service request. The resource deployment module 120 modifies a data structure stored in the assignment database 155 to add the assigned service request to the resource's schedule.

The resource can optionally open the assignment notification 600 and reject the assignment, causing a notification indicative of the assignment rejection to be returned to the resource deployment module 120. If the resource deployment module 120 determines at block 520 that the assigned service request has been rejected, the resource deployment module 120 re-assigns the service request to a different resource at block 515. The data structure comprising the schedule of the resource to whom the service request was previously assigned is again modified, to remove the rejected service request. The resource deployment module 120 also modifies a data structure stored in the assignment database 155 to add the assigned service request to the schedule of the resource to whom the service request has been re-assigned. Re-assignment can optionally occur without manual intervention, or a notification can be transmitted to the dispatch terminal 115, indicating that the assignment was rejected.

Assignment and optionally re-assignment occur until, at block 520, it is determined that the service request has not been rejected. According to another embodiment, the process of assigning and re-assigning the service request can continue for a defined number of iterations, until a threshold amount of time before the start time of the service request remains, until all eligible resources have rejected the service request, or until another condition is satisfied.

If, at block 510, it is determined that the resource is to be assigned via collaboration, then the resource deployment module 120 generates an electronic invitation 125 to perform the activity of the service request at block 525. The resource deployment module 120 controls concurrent transmission of the electronic invitation 125 over the communication network 110 to the remote device 100 associated with each of the plurality of eligible resources at step 530.

Figure 6A:
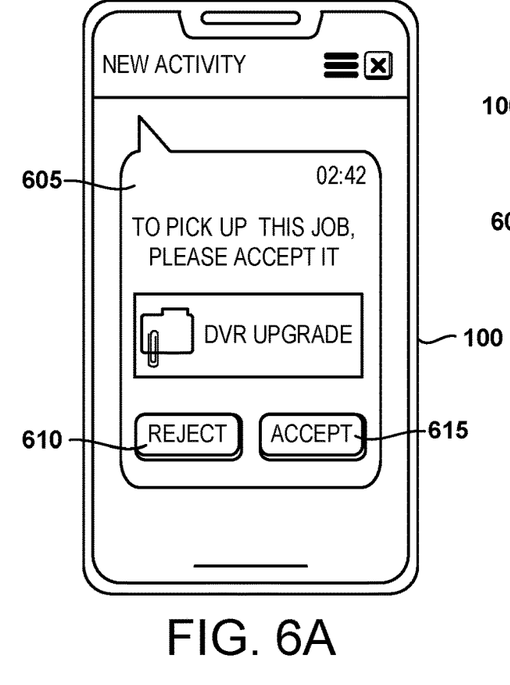
FIG. 6A shows an offer notification.
Figure 6B:
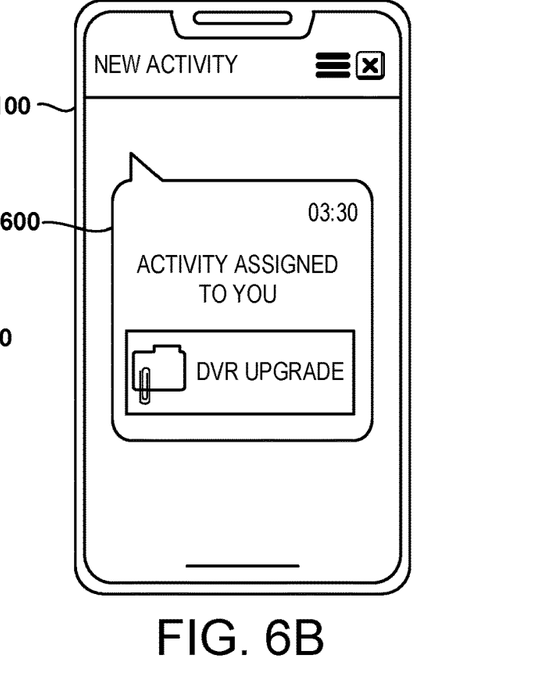
FIG. 6B shows an assignment notification.

The electronic invitation 125, when received by the remote devices 100 of the eligible resources, causes the remote devices 100 to display an offer notification 605, shown in FIG. 6A. The offer notification 605 presents each of the eligible resources with a reject option 610 and an accept option 615. Selection of the reject option 610 causes the remote device 100 to transmit a rejection to the resource deployment module 120, preventing the resource deployment module 120 from assigning the service request to the rejecting resource.

In response to determining that the electronic invitation 125 has become stale, or in response to receiving a rejection from all the eligible resources, determined at block 535, the resource deployment module 120 can execute one or more fallback scenarios at block 540. For example, the resource deployment module 120 can transmit a timeout notification 620 to the remote devices 100 as shown in FIG. 6D, notifying the resources that the electronic invitation 125 was not accepted by anyone. As another example, the resource deployment module 120 can control transmission of a similar notification to the dispatch terminal 115.

Selection of the accept option 615 causes the remote device 100 to transmit an acceptance to the resource deployment module 120. In response to receiving the rejection, the resource deployment module 120 determines whether the received acceptance is the first acceptance at block 545. If so, the resource deployment module 120 modifies the data structure corresponding to the accepting resource in the assignment database 155, at block 550, to add the service request to the accepting resource's schedule. The resource deployment module 120 also controls transmission of the assignment notification 600, as shown in FIG. 6B, to the remote device 100 linked to resource that the service request has been assigned to.

Figure 6C:
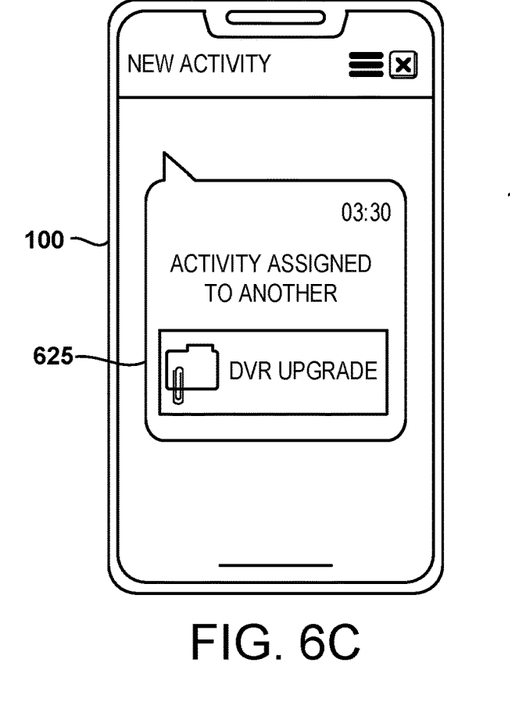
FIG. 6C shows an alternate assignment notification.
Figure 6D:
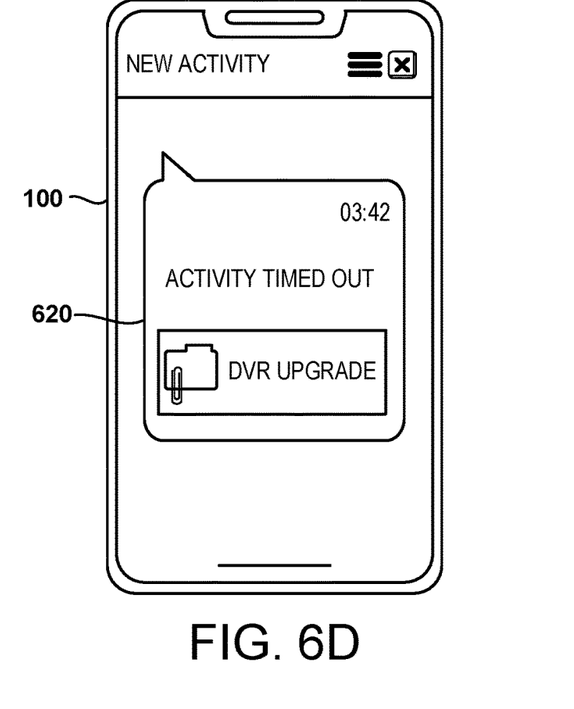
FIG. 6D shows a timeout notification.

Further, at block 555, the resource deployment module 120 controls transmission of an alternate assignment notification 625, shown in FIG. 6C, to the remote devices 100 linked to the resources that were not the first to accept the electronic invitation 125. The alternate assignment notification 625 can also be transmitted to remote devices 100 utilized by those resources who may have selected the accept option 615, but were identified at block 550 as not being the first to do so. The alternate assignment notification 625 notifies each recipient that the service request was not assigned to them. The alternate assignment notification 625 can be concurrently transmitted over the communication network 110, to cause the remote devices to notify the respective resources that the electronic invitation 125 is no longer outstanding, and capable of being accepted. According to one embodiment, transmitting the alternate assignment notification 625 can also cause the remote devices 100 to render the electronic invitation 125 unacceptable. For example, the accept option 615 may no longer be displayed, or it may be grayed out, rendering it inactive.

Computing Device Embodiment

Figure 7:
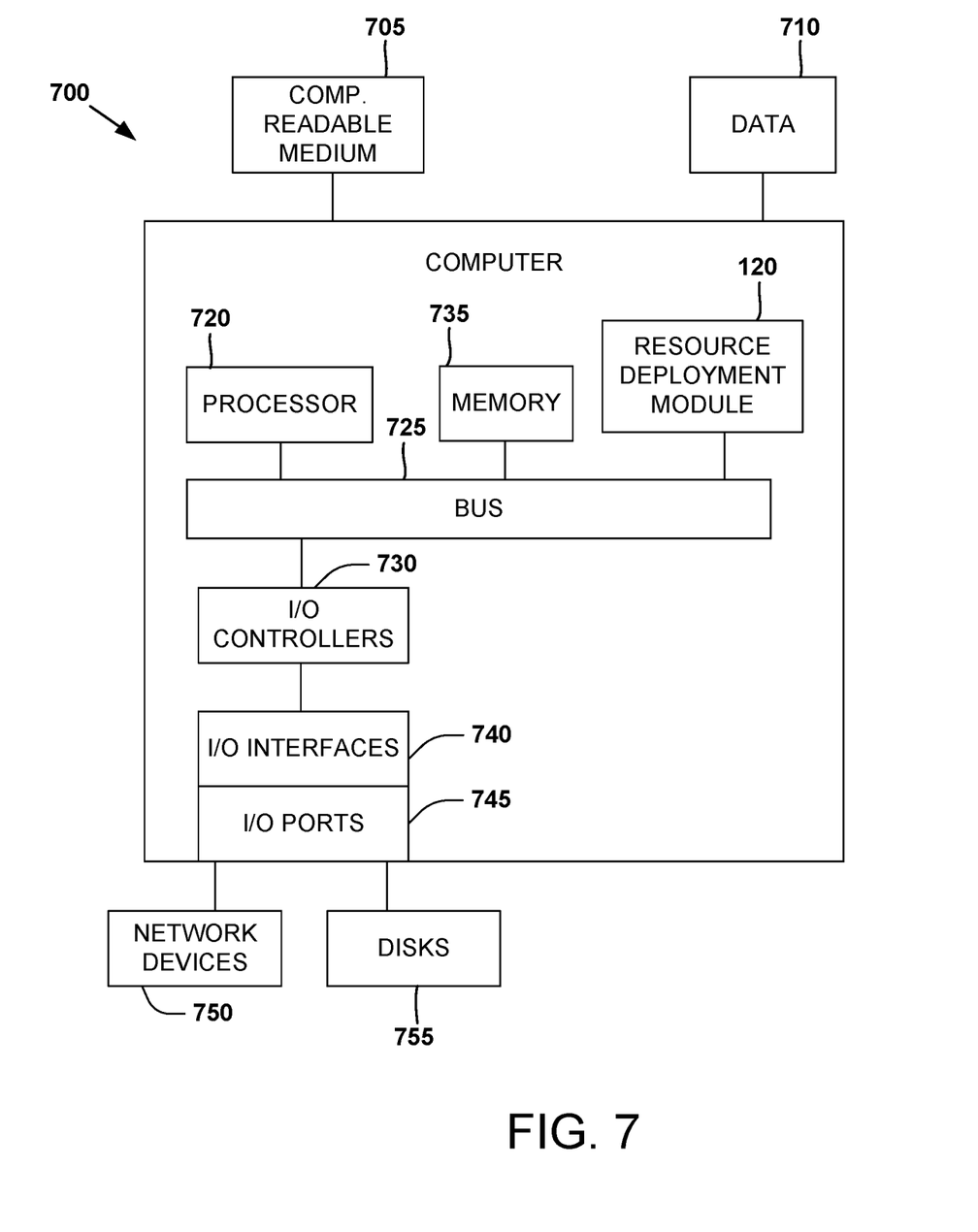
FIG. 7 illustrates an embodiment of a computing system configured with the example systems and/or methods disclosed.

FIG. 7 illustrates an example computing device that is configured and/or programmed with one or more of the example systems and methods described herein, and/or equivalents. The example computing device may be a computer 700 that includes a processor 720, a memory 735, and input/output ports 745 operably connected by a bus 725. In one example, the computer 700 may include resource deployment module logic 120 and configured to facilitate generation and concurrent transmission of an electronic invitation 125 to perform an activity similar to the multi-tenant platform 120 shown in FIG. 1 and described above, and/or configured to implement and perform method 600, in one embodiment. In different examples, the logic 120 may be implemented in hardware, a non-transitory computer-readable medium with stored instructions, firmware, and/or combinations thereof. While the logic 120 is illustrated as a hardware component attached to the bus 725, it is to be appreciated that in other embodiments, the logic 120 could be implemented in the processor 720, stored in memory 735, or stored in disk 705.

In one embodiment, logic 120 or the computer 700 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to generate the electronic invitation 125 and assign the service request as described herein. The means may also be implemented as stored computer executable instructions that are presented to computer 700 as data 710 that are temporarily stored in memory 735 and then executed by processor 720.

Logic 120 may also provide means (e.g., hardware, non-transitory computer-readable medium that stores executable instructions, firmware) for performing a method of assigning a service request as described herein.

Generally describing an example configuration of the computer 700, the processor 720 may be a variety of various processors including dual microprocessor and other multi-processor architectures. A memory 735 may include volatile memory and/or non-volatile memory. Non-volatile memory may include, for example, ROM, PROM, and so on. Volatile memory may include, for example, RAM, SRAM, DRAM, and so on.

A storage disk 755 may be operably connected to the computer 700 via, for example, an input/output (I/O) interface (e.g., card, device) 740 and an input/output port 745, the I/O interface 740 being controlled by an I/O controller 730. The disk 755 may be, for example, a magnetic disk drive, a solid-state disk drive, a floppy disk drive, a tape drive, a Zip drive, a flash memory card, a memory stick, and so on. Furthermore, the disk 755 may be a CD-ROM drive, a CD-R drive, a CD-RW drive, a DVD ROM, and so on. The memory 735 can store a process and/or a data 710, for example. The disk 755 and/or the memory 735 can store an operating system that controls and allocates resources of the computer 700.

The computer 700 may interact with input/output (I/O) devices via the I/O interfaces 740 and the input/output ports 745. Input/output devices may be, for example, a keyboard, a microphone, a pointing and selection device, cameras, video cards, displays, the disk 755, the network devices 750, and so on. The input/output ports 745 may include, for example, serial ports, parallel ports, and USB ports.

The computer 700 can operate in a network environment and thus may be connected to the network devices 750 via the I/O interfaces 740, and/or the I/O ports 745. Through the network devices 750, the computer 700 may interact with a network. Through the network, the computer 700 may be logically connected to remote computers. Networks with which the computer 600 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
DVD: digital versatile disk and/or digital video disk.
HTTP: hypertext transfer protocol.
LAN: local area network.
RAM: random access memory.
ROM: read only memory.
SQL: structured query language.
USB: universal serial bus.
WAN: wide area network.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User" or "dispatcher," as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that, when executed by at least a processor of a computing system, cause the computing system to:
   receive, by at least the processor from a service customer, a service request comprising an activity to be performed for the service customer;
   access, by at least the processor, a data structure corresponding to the activity within a database to (i) identify a plurality of resources that are eligible to perform the activity, wherein the plurality of resources that are eligible to perform the activity is based upon a proximity of each of the plurality of resources to a location where the activity is to be performed, a skill of each of the plurality of resources that is required to perform the activity, and equipment required to perform the activity, and (ii) identify a remote device associated with each of the plurality of resources;
   generate, by at least the processor, a first user interface for creating a profile that governs how an electronic invitation is transmitted to the remote device associated with each of the plurality of resources;
   wherein the first user interface comprises:
      a plurality of menus for receiving user input to define when and how frequently the electronic invitation is transmitted to the remote device, and
      a plurality of assignment and fallback fields for receiving user input to define how the service request will be added to a schedule of a resource that accepts the electronic invitation;
   in response to receiving the user input from the first user interface (i) that defines when and how frequently the electronic invitation is transmitted to the remote device and (ii) that defines how the service request will be added to a schedule of a resource that accepts the electronic invitation: create the profile that governs how an electronic invitation is transmitted to the remote device associated with each of the plurality of resources;
   in response to creating the profile, generate, by at least the processor, a second user interface for defining the activity to be performed by the resource that accepts the electronic invitation and providing information about the service customer;
   wherein the second user interface comprises:
      a plurality of activity fields for receiving user input to define the activity to be performed by the resource that accepts the electronic invitation, and
      a plurality of customer fields for receiving user input to provide information about the service customer;
   in response to creating the profile, and receiving the user input from the second user interface (i) that defines the activity to be performed, and (ii) that provides information about the service customer:
      generate, by at least the processor, the electronic invitation to perform the activity, wherein the electronic invitation comprises an option that is selectable by each of the plurality of resources that receives the electronic invitation to indicate acceptance of the electronic invitation to perform the activity;
   in response to generating the electronic invitation, control, by at least the processor, concurrent transmission of the electronic invitation over a communication network to the remote device associated with each of the plurality of resources identified from the data structure;
   wherein the concurrent transmission of the electronic invitation causes the plurality of resources to receive the electronic invitation during substantially the same time period and allows the plurality of resources to consider the electronic invitation to perform the activity during substantially the same time period;
   receive, by at least the processor, an earliest acceptance of the electronic invitation transmitted by a remote device over the communication network associated with a first resource included in the plurality of resources;
   in response to receiving the earliest acceptance of the electronic invitation, generate, by at least the processor, a modified data structure to add the service request to a schedule associated with the first resource to include the service request as a result of receiving the earliest acceptance;
   wherein the modified data structure includes a graphical representation of the schedule associated with the first resource and the graphical representation is in a calendar format;
   transmit the modified data structure to the first resource to notify the first resource that the activity is to be performed by the first resource; and
   in response to transmitting the modified data structure to the first resource, deploy the first resource to cause the activity to be performed by the first resource according to the schedule associated with the first resource.

2. The non-transitory computer-readable medium of claim 1, wherein the database comprises a plurality of data structures, wherein each of the plurality of data structures comprises a collection of resources that have been designated as being eligible to perform different activities.

3. The non-transitory computer-readable medium of claim 1, further comprising instructions that when executed by at least the processor cause the computing system to:
   generate, by at least the processor, an electronic confirmation indicating that the service request is included on the schedule associated with the first resource; and
   control, by at least the processor, transmission of the electronic confirmation over the communication network to the remote device associated with the first resource, notifying the first resource that the activity is to be performed by the first resource.

4. The non-transitory computer-readable medium of claim 3, further comprising instructions that when executed by at least the processor cause the computing system to:
   generate, by at least the processor, an electronic cancellation indicating that the first acceptance has been received; and
   control, by at least the processor, concurrent transmission of the electronic cancellation over the communication network to the remote device associated with the plurality of resources other than the first resource, notifying the plurality of resources other than the first resource that that the electronic invitation has been accepted, and is no longer outstanding.

5. The non-transitory computer-readable medium of claim 1, further comprising instructions that when executed by at least the processor cause the computing system to:
- determine, by at least the processor, that the electronic invitation is stale because the electronic invitation has not been accepted within a defined period of time specified in the data structure; and
- control, by at least the processor, transmission of a fallback notification over the communication network before the earliest acceptance is received.

6. The non-transitory computer-readable medium of claim 5, wherein content included in the fallback notification is defined within the service request.

7. The non-transitory computer-readable medium of claim 6, wherein the content included in the fallback notification comprises an alert to a dispatcher that indicates the earliest acceptance has not been received.

8. The non-transitory computer-readable medium of claim 1, further comprising instructions that when executed by at least the processor cause the computing system to:
- render, by at least the processor, the electronic invitation unacceptable to add the service request to another schedule in response to receiving the earliest acceptance.

9. A computing system, comprising:
- at least one processor connected to at least one memory;
- a storage device storing a database comprising a plurality of data structures that are associated with different activities to be performed; and
- a resource deployment module stored on a non-transitory computer readable medium and including instructions that when executed by at least the at least one processor cause the computing system to:
  - receive, by at least the one processor, a service request from a service customer comprising an activity to be performed for the service customer;
  - access, by at least the one processor, a data structure from the plurality of data structures within the database corresponding to the activity to (i) identify a plurality of resources in the data structure that are eligible to perform the activity, wherein the plurality of resources that are eligible to perform the activity is based upon a proximity of each of the plurality of resources to a location where the activity is to be performed, a skill of each of the plurality of resources that is required to perform the activity, and equipment required to perform the activity, and (ii) identify a remote device associated with each of the plurality of resources;
  - generate, by at least the one processor, a first user interface for creating a profile that governs how an electronic invitation is transmitted to the remote device associated with each of the plurality of resources;
  - wherein the first user interface comprises:
    - a plurality of menus for receiving user input to define when and how frequently the electronic invitation is transmitted to the remote device; and
    - a plurality of assignment and fallback fields for receiving user input to define how the service request will be added to a schedule of a resource that accepts the electronic invitation;
  - in response to receiving the user input from the first user interface (i) that defines when and how frequently the electronic invitation is transmitted to the remote device and (ii) that defines how the service request will be added to a schedule of a resource that accepts the electronic invitation: create the profile that governs how an electronic invitation is transmitted to the remote device associated with each of the plurality of resources;
  - in response to creating the profile, generate, by at least the one processor, a second user interface for defining the activity to be performed by the resource that accepts the electronic invitation and provide information about the service customer;
  - wherein the second user interface comprises:
    - a plurality of activity fields for receiving user input to define the activity to be performed by the resource that accepts the electronic invitation; and
    - a plurality of customer fields for receiving user input to provide information about the service customer;
  - in response to creating the profile, and receiving the user input from the second user interface (i) that defines the activity to be performed, and (ii) that provides information about the service customer:
    - generate, by at least the processor, the electronic invitation to perform the activity, the electronic invitation comprising an option that is selectable by each of the plurality of resources that receives the electronic invitation to indicate acceptance of the electronic invitation to perform the activity;
  - in response to generating the electronic invitation, control, by at least the processor, concurrent transmission of the electronic invitation over a communication network to the remote device associated with each of the plurality of resources identified from the data structure;
  - wherein the concurrent transmission of the electronic invitation causes the plurality of resources to receive the electronic invitation during substantially the same time period and allows the plurality of resources to consider the electronic invitation to perform the activity during substantially the same time period;
  - receive, by at least the processor, an earliest acceptance of the electronic invitation transmitted over the communication network by a remote device associated with a first resource included in the plurality of resources;
  - in response to receiving the earliest acceptance of the electronic invitation, generate, by at least the processor, a modified data structure to add the service request to a schedule associated with the first resource to include the service request as a result of receiving the earliest acceptance;
  - wherein the modified data structure includes a graphical representation of the schedule associated with the first resource and the graphical representation is in a calendar format;
  - transmit the modified data structure to the first resource to notify the first resource that the activity is to be performed by the first resource; and
  - deploy the first resource to cause the activity to be performed by the first resource according to the schedule associated with the first resource.

10. The computing system of claim 9,
wherein each of the plurality of data structures in the database comprises a collection of resources that have been designated as being eligible to perform a respective one of the plurality of different activities.

11. The computing system of claim 9, wherein the resource deployment module further comprises instructions that when executed by at least the one processor cause the computing system to:
   generate, by at least the one processor, an electronic confirmation indicating that the service request is included on the schedule associated with the first resource; and
   control, by at least the one processor, transmission of the electronic confirmation over the communication network to the remote device associated with the first resource, notifying the first resource that the activity is to be performed by the first resource.

12. The computing system of claim 11, wherein the resource deployment module further comprises instructions that when executed by at least the one processor cause the computing system to:
   generate, by at least the one processor, an electronic cancellation indicating that the first acceptance has been received; and
   control, by at least the one processor, concurrent transmission of the electronic cancellation over the communication network to the remote device associated with the plurality of resources other than the first resource, notifying the plurality of resources other than the first resource that that the electronic invitation has been accepted, and is no longer outstanding.

13. The computing system of claim 9, wherein the resource deployment module further comprises instructions that when executed by at least the one processor cause the computing system to:
   determine, by at least the one processor, that the electronic invitation is stale because the electronic invitation has not been accepted within a defined period of time specified in the data structure; and
   control, by at least the one processor, transmission of a fallback notification over the communication network before the earliest acceptance is received.

14. The computing system of claim 13, wherein content included in the fallback notification is defined within the service request.

15. The computing system of claim 14, wherein the content included in the fallback notification comprises an alert to a dispatcher that indicates the earliest acceptance has not been received.

16. The computing system of claim 9, wherein the resource deployment module further comprises instructions that when executed by at least the one processor cause the computing system to:
   render, by at least the one processor, the electronic invitation unacceptable to add the service request to another schedule in response to receiving the earliest acceptance.

17. A computer-implemented method, the method comprising:
   receiving, by at least a processor, a service request from a service customer comprising an activity to be performed for the service customer;
   accessing, by at least the processor, a data structure corresponding to the activity within a database to (i) identify a plurality of resources in the data structure that are eligible to perform the activity, wherein the plurality of resources that are eligible to perform the activity is based upon a proximity of each of the plurality of resources to a location where the activity is to be performed, a skill of each of the plurality of resources that is required to perform the activity, and equipment required to perform the activity, and (ii) identify a remote device associated with each of the plurality of resources;
   generating, by at least the processor, a first user interface for creating a profile that governs how an electronic invitation is transmitted to the remote device associated with each of the plurality of resources;
   wherein the first user interface comprises:
      a plurality of menus and buttons for defining when and how frequently the electronic invitation is transmitted to the remote device, and
      a plurality of assignment and fallback fields and buttons for defining how the service request will be added to a schedule of a resource that accepts the electronic invitation;
   in response to receiving the user input from the first user interface (i) that defines when and how frequently the electronic invitation is transmitted to the remote device and (ii) that defines how the service request will be added to a schedule of a resource that accepts the electronic invitation: creating the profile that governs how an electronic invitation is transmitted to the remote device associated with each of the plurality of resources;
   in response to creating the profile, generating, by at least the processor, a second user interface for defining the activity to be performed by the resource that accepts the electronic invitation and providing information about the service customer;
   wherein the second user interface comprises:
      a plurality of activity fields for defining the activity to be performed by the resource that accepts the electronic invitation, and
      a plurality of customer fields for providing information about the service customer;
   in response to creating the profile and receiving the user input that defines the activity to be performed via the second user interface:
      generating, by at least the processor, the electronic invitation to perform the activity, the electronic invitation comprising an option that is selectable by each of the plurality of resources that receives the electronic invitation to indicate acceptance of the electronic invitation to perform the activity;
   in response to generating the electronic invitation, controlling, by at least the processor, concurrent transmission of the electronic invitation over a communication network to the remote device associated with each of the plurality of resources identified from the data structure;
   receiving, by at least the processor, an earliest acceptance of the electronic invitation transmitted by a remote device over the communication network associated with a first resource included in the plurality of resources;
   in response to receiving the earliest acceptance of the electronic invitation, generating, by at least the processor, a modified data structure to add the service request to a schedule associated with the first resource to include the service request as a result of receiving the earliest acceptance;
   wherein the modified data structure includes a graphical representation of the schedule associated with the first resource and the graphical representation is in a calendar format;

transmitting the modified data structure to the first resource to notify the first resource that the activity is to be performed by the first resource; and deploying the first resource to cause the activity to be performed by the first resource according to the schedule associated with the first resource.

18. The computer-implemented method of claim 17 further comprising:

generating, by at least the processor, an electronic confirmation indicating that the service request is included on the schedule associated with the first resource; and controlling, by at least the processor, transmission of the electronic confirmation over the communication network to the remote device associated with the first resource, notifying the first resource that the activity is to be performed by the first resource.

19. The computer-implemented method of claim 18, further comprising:

generating, by at least the processor, an electronic cancellation indicating that the first acceptance has been received; and controlling, by at least the processor, concurrent transmission of the electronic cancellation over the communication network to the remote device associated with the plurality of resources other than the first resource, notifying the plurality of resources other than the first resource that that the electronic invitation has been accepted, and is no longer outstanding.

20. The computer-implemented method of claim 17, further comprising:

determining, by at least the processor, that the electronic invitation is stale because the electronic invitation has not been accepted within a defined period of time specified in the data structure; and controlling, by at least the processor, transmission of a fallback notification over the communication network before the earliest acceptance is received.

* * * * *

UNITED STATES PATENT AND TRADEMARK OFFICE
CERTIFICATE OF CORRECTION

PATENT NO. : 11,620,596 B2
APPLICATION NO. : 16/271936
DATED : April 4, 2023
INVENTOR(S) : Kattil et al.

It is certified that error appears in the above-identified patent and that said Letters Patent is hereby corrected as shown below:

In the Specification

In Column 12, Line 57, delete "on)." and insert -- on. --, therefor.

In the Claims

In Column 16, Line 66, in Claim 4, delete "that that" and insert -- that --, therefor.

In Column 19, Line 26, in Claim 12, delete "that that" and insert -- that --, therefor.

In Column 22, Line 9, in Claim 19, delete "that that" and insert -- that --, therefor.

Signed and Sealed this
Thirteenth Day of February, 2024

Katherine Kelly Vidal
*Director of the United States Patent and Trademark Office*